US009853596B2

(12) United States Patent
West et al.

(10) Patent No.: US 9,853,596 B2
(45) Date of Patent: Dec. 26, 2017

(54) LOW-SLOPE MOUNTED PHOTOVOLTAIC ARRAY

(71) Applicant: SolarCity Corporation, San Mateo, CA (US)

(72) Inventors: Jack Raymond West, San Rafael, CA (US); Brian Atchley, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/490,087

(22) Filed: Sep. 18, 2014

(65) Prior Publication Data

US 2015/0075589 A1    Mar. 19, 2015

Related U.S. Application Data

(60) Provisional application No. 61/879,521, filed on Sep. 18, 2013.

(51) Int. Cl.
*H02S 20/24*    (2014.01)
*F24J 2/52*    (2006.01)
*H02S 20/30*    (2014.01)

(52) U.S. Cl.
CPC ............ *H02S 20/24* (2014.12); *F24J 2/5233* (2013.01); *F24J 2/5239* (2013.01); *H02S 20/30* (2014.12); *Y02B 10/12* (2013.01); *Y02B 10/20* (2013.01); *Y02E 10/47* (2013.01)

(58) Field of Classification Search
CPC ......... Y02E 10/47; Y02E 10/50; Y02B 10/12; H02S 20/00; H02S 20/24; H01L 31/0422; F24J 2/5245; E04D 3/40; E04D 13/00

USPC .. 52/27, 173.1, 173.3, 800.1, 800.11, 801.1; 136/243–245

See application file for complete search history.

(56) References Cited

U.S. PATENT DOCUMENTS

| | | | | |
|---|---|---|---|---|
| 7,435,897 B2 * | 10/2008 | Russell | ......................... | 136/244 |
| 2006/0053706 A1 * | 3/2006 | Russell | ......................... | 52/173.3 |
| 2008/0040990 A1 * | 2/2008 | Vendig et al. | ................ | 52/173.3 |
| 2009/0242014 A1 * | 10/2009 | Leary | ............................ | 136/251 |

(Continued)

FOREIGN PATENT DOCUMENTS

| | | | | |
|---|---|---|---|---|
| DE | WO 2013120677 A1 * | 8/2013 | ............. | F24J 2/5233 |
| KR | 101351530 B1 * | 1/2014 | | |
| WO | 2013119218 A2 | 8/2013 | | |

OTHER PUBLICATIONS

Machine translation of foreign reference KR 101351530 B1, obtained from http://kposd.kipo.go.kr:8088/kiponet/up/kpion/patent/publication/selectLstPatentPublication.do (last accessed on Apr. 30, 2017).*

(Continued)

*Primary Examiner* — Theodore Adamos
(74) *Attorney, Agent, or Firm* — Kilpatrick Townsend & Stockton LLP (57) ABSTRACT

A photovoltaic array mounting system for a low-slope roof having interchangeable first and second bases, with a short leg extending from the first base at a non-vertical angle and a long leg extending from the second base at a non-vertical angle, wherein the short and long legs support opposite sides of a photovoltaic module such that the module is held at a non-horizontal angle, and wherein rock-in connectors are provided on top of the short and long legs permitting fast and easy system installation.

19 Claims, 6 Drawing Sheets

(56) References Cited

U.S. PATENT DOCUMENTS

| | | | |
|---|---|---|---|
| 2010/0089390 A1* | 4/2010 | Miros et al. ............... | 126/608 |
| 2011/0000519 A1* | 1/2011 | West ..................... | F24J 2/5211 |
| | | | 136/244 |
| 2012/0031468 A1 | 2/2012 | Boise et al. | |
| 2012/0061337 A1* | 3/2012 | Seery ..................... | F24J 2/5205 |
| | | | 211/41.1 |
| 2012/0152326 A1* | 6/2012 | West ..................... | F24J 2/5205 |
| | | | 136/251 |
| 2012/0237348 A1 | 9/2012 | Thomen et al. | |
| 2012/0266944 A1 | 10/2012 | Wildes | |
| 2012/0298817 A1 | 11/2012 | West et al. | |
| 2013/0112248 A1* | 5/2013 | McPheeters ............... | 136/251 |
| 2013/0312812 A1* | 11/2013 | Meyer et al. .............. | 136/246 |
| 2013/0318894 A1* | 12/2013 | Khowaiter ............ | F24J 2/5245 |
| | | | 52/173.3 |
| 2014/0044471 A1* | 2/2014 | Yen ..................... | 403/73 |

OTHER PUBLICATIONS

International Search Report dated Dec. 31, 2014 in PCT Application No. PCT/US2014/056298; 2 pages.
Written Opinion dated Dec. 31, 2014 in PCT Application No. PCT/US2014/056298; 5 pages.
International Preliminary Report on Patentability dated Mar. 31, 2016 in PCT Application No. PCT/US2014/056298; 7 pages.

\* cited by examiner

LOW-SLOPE MOUNTED PHOTOVOLTAIC ARRAY

RELATED APPLICATION

The present invention claims priority to U.S. Provisional Patent Application 61/879,521, of same title, filed Sep. 18, 2013.

SUMMARY OF THE INVENTION

The present invention provides a low-slope photovoltaic array mounting system. A short leg extends upwardly from a first base and a long leg extends upwardly from a second base. A rock-in connector is mounted at the top of each of the short and long legs. These rock-in connectors attach directly to upper and lower edges of a photovoltaic module to support the module at a low-slope angle. As will be shown, an advantage of the present system is that it can be assembled very quickly and easily.

As will also be shown, the present system can be used to form arrays with all panels in successive rows oriented in the same direction (e.g.: North/South arrays) or with successive rows tilted in opposite directions (e.g.: East/West arrays).

A further advantage of the present system is that the legs extend upwardly at a non-vertical angle, and that this non-vertical angle of support actually assists in locking the short front legs into position.

BRIEF DESCRIPTION OF THE DRAWINGS

FIG. 3D-2 is a view similar to FIG. 3D, but with one of the module rows tilting in an opposite direction.

DETAILED DESCRIPTION OF THE DRAWINGS

The present invention provides a low-slope mounting system for a photovoltaic array. As will be shown, an advantage of the present invention is it is quick and easy to set-up. This is due both to the minimal number of parts used, and the ease of attachment of these parts to one another.

Figure 1:
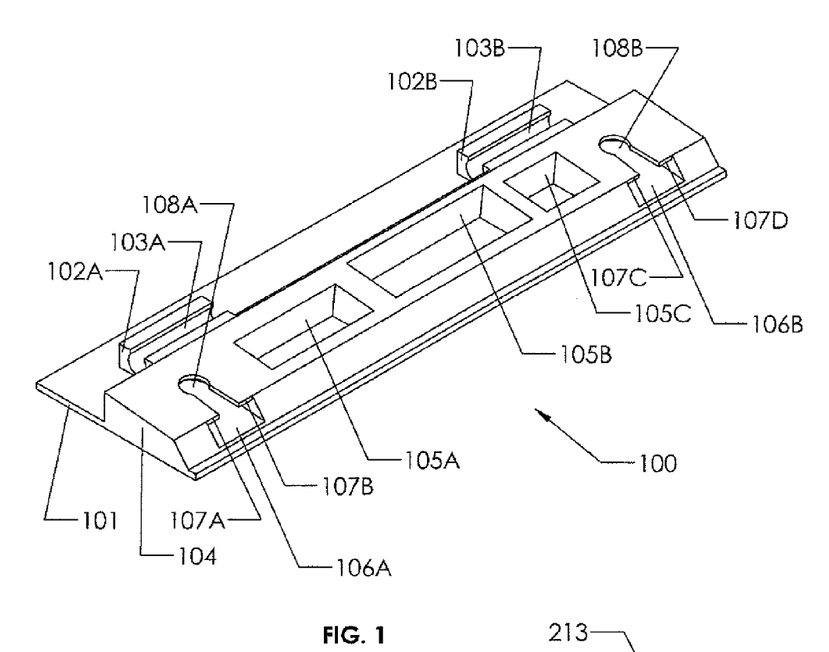
FIG. 1 is a perspective view of an exemplary base.
Figure 2:
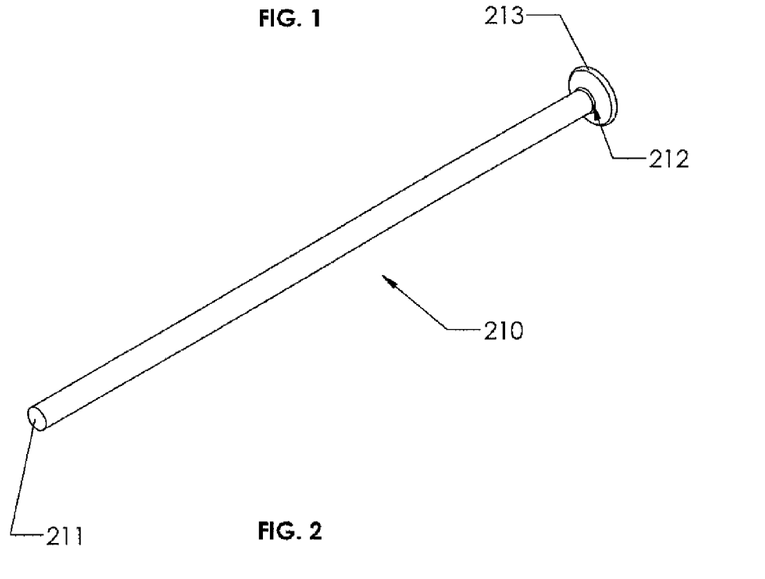
FIG. 2 is a perspective view of an exemplary leg.
Figures 3A, 3B, 3C:
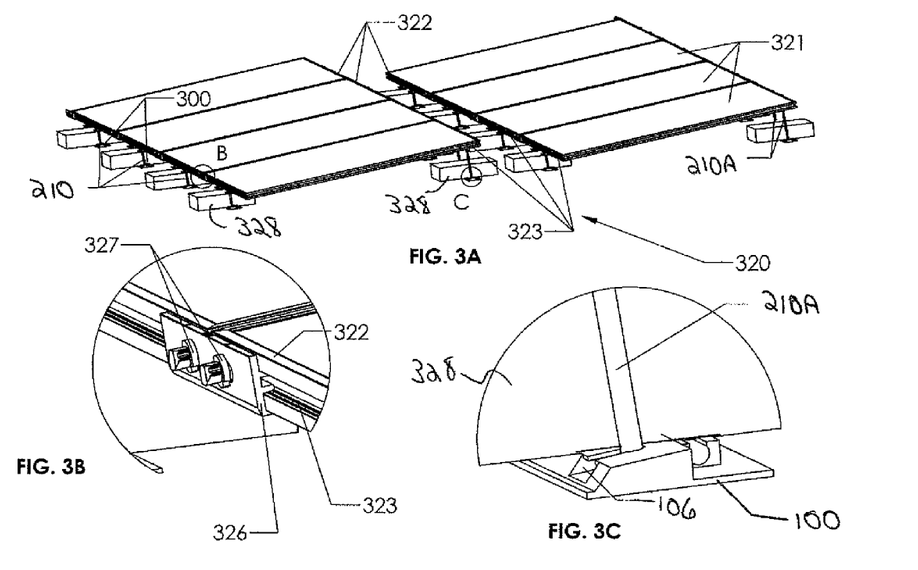
FIG. 3A is a perspective view of an assembled photovoltaic array according to an aspect of the invention.
FIG. 3B is a close-up view corresponding to region B in FIG. 3A.
FIG. 3C is a close-up view corresponding to region C in FIG. 3A.
Figure 3D:
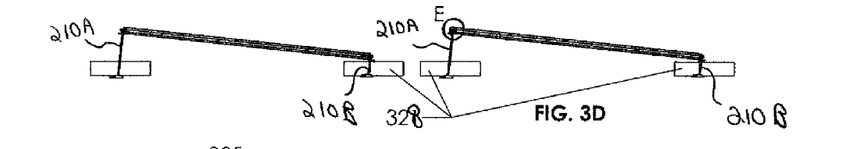
FIG. 3D is a side elevation view of the array of FIG. 3A.
Figure 3D:
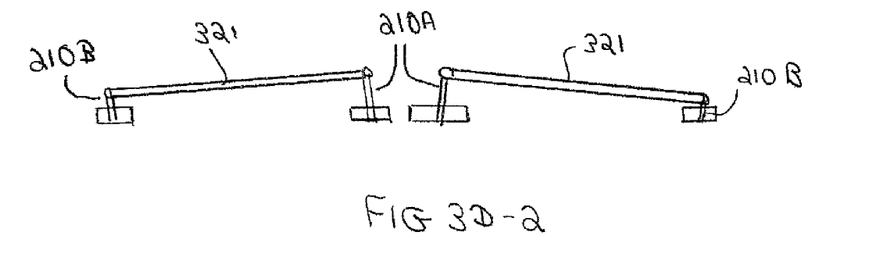
Figure 3E:
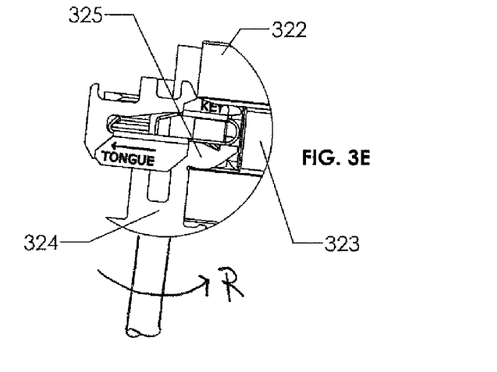
FIG. 3E is a close-up view corresponding to region E in FIG. 3D.
Figure 4A:
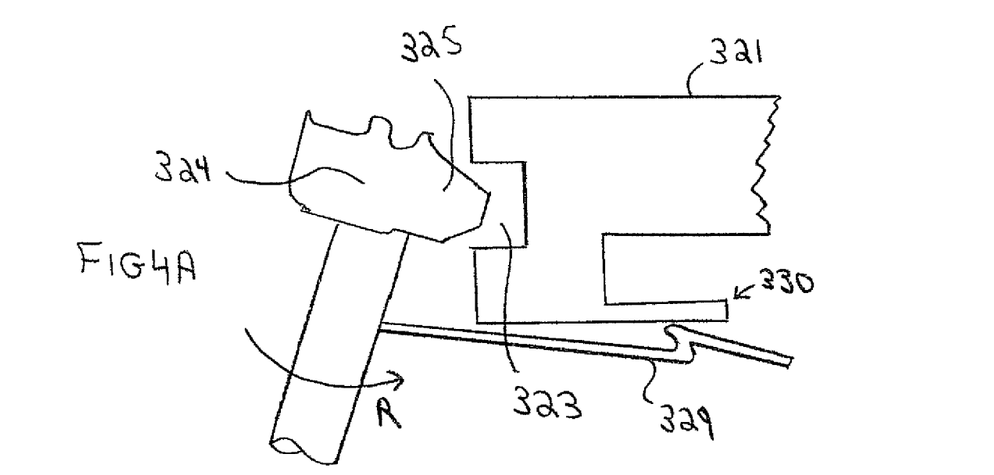
FIG. 4A is a side elevation view of an exemplary clip that secures the long leg to an upper side of the photovoltaic module prior to locking the long leg into position.
Figure 4B:
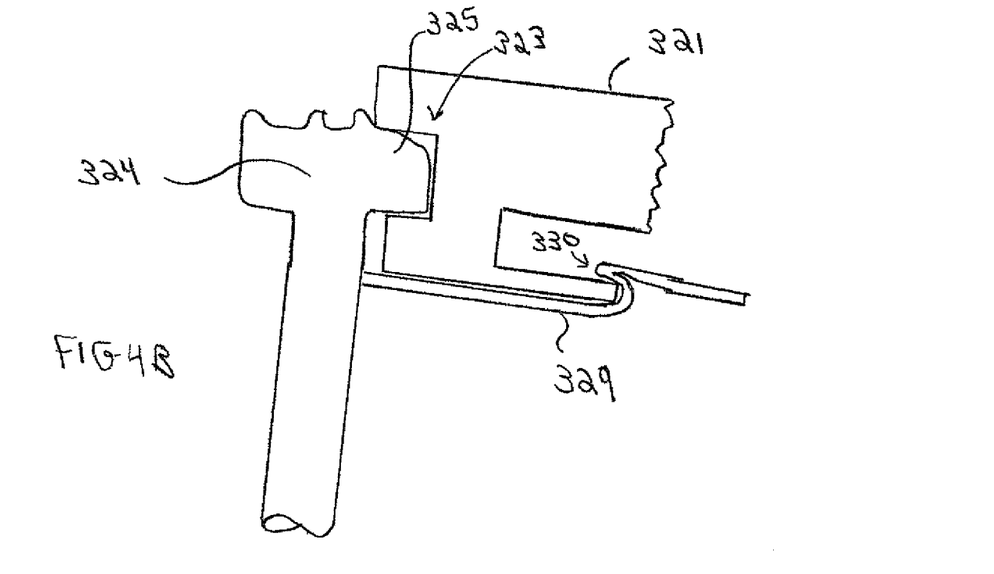
FIG. 4B is a side elevation view of an exemplary clip that secures the long leg to an upper side of the photovoltaic module after locking the long leg into position.
Figure 5:
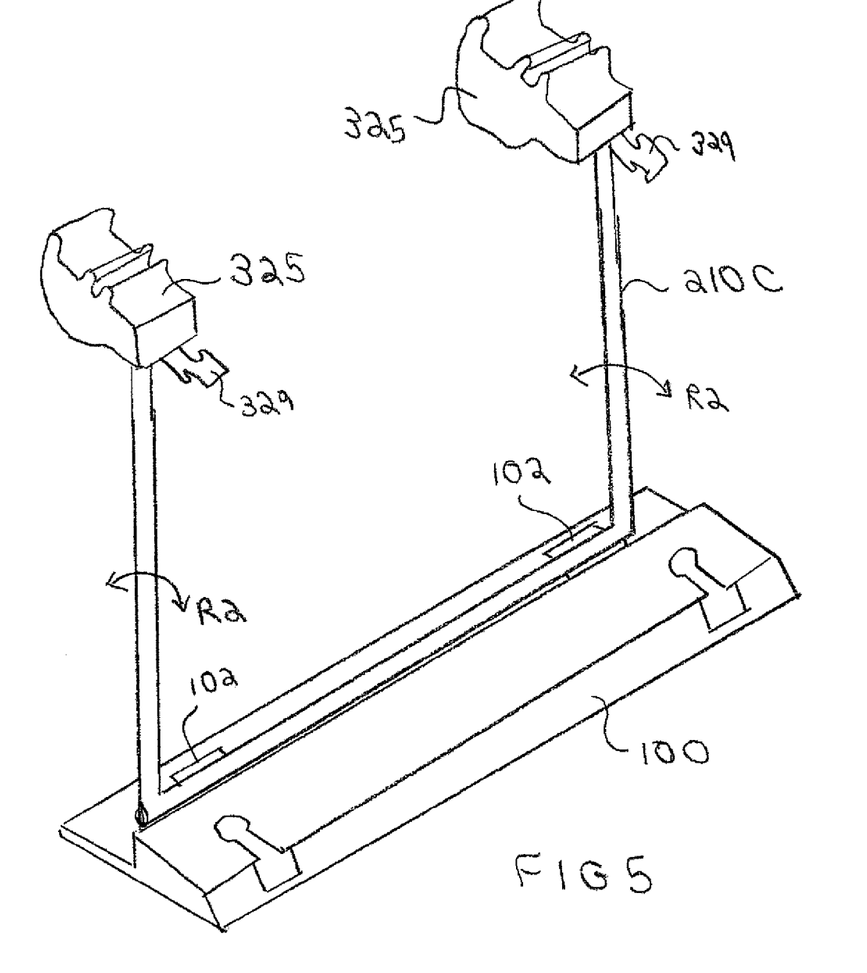
FIG. 5 is a perspective view of a U-shaped long leg with two rock-in connectors for securing to an upper side of a photovoltaic module.

FIGS. 3A and 3D illustrate such an array mounted with the mounting system according to various embodiments of the invention, while FIGS. 3B, 3C and 3E show close-up views of parts of this array and mounting system. FIGS. 1 and 2 show the bases and legs of this novel array, and FIGS. 4A, 4B and 5 show optional components of this array, as follows.

FIG. 1 shows a support base 100. Base 100 includes a base panel 101, a riser 104 with apertures 105A-105C defining slots 106A and 106B, each slot having a pair of overhangs 107A-107D that together define outlets 108A and 108B, as shown. As will be explained, legs (see FIG. 2) have flared bottom ends that can be received in slots 106A and 106B. Slots 106A and 106B may be rectangular as shown, or may be any other suitable shape. Additionally, outlets 108A and 108B may be keyhole-shaped, rectangular, circular or other suitable shape. Optional apertures 105A-105C through the base 100 may also be provided to minimize the material used in making the base. Base 100 may be made of any suitable material, including but not limited to aluminum, steel, any metal or alloy, composite, plastic or other material. Base 100 may be forged, cast, molded or otherwise formed.

FIG. 2 shows a leg 210. As will be explained, leg 210 may either be the "long leg" 210A as described herein, or it may be the "short leg" 210B as described herein (depending on the length of the leg). Leg 210 may include rod 211 with threaded end 212 that screws into flared foot 213. Foot 213 may be conical or other suitable shape. As such, the rotation of rod 211 with respect to flared foot 213 may move threaded end 212 in and out of flared foot 213 such that the overall length of leg 210 can be adjusted.

FIGS. 3A to 3E show an array assembled according to the present invention. As such, array 320 includes photovoltaic modules 321, having frames 322 with grooves 323 therein. Rock-in couplings 324 have a male portion 325 that is received into groove 323 on each of the modules frames. Long legs 210A support the upper side of photovoltaic modules 321, while short legs 210B support the opposite lower side of photovoltaic modules 321. Optional ballast blocks 328 are also provided between pairs of short legs 201A or between the pairs of long legs 210B, as shown. FIG. 3D-2 is a view similar to FIG. 3D, but with the module rows tilting in opposite directions (for example for use as an East/West array). As can also be best seen in FIG. 3D, long legs 210A and short legs 210B may both be used in pairs, with ballast blocks 328 placed therebetween. It is to be understood that the present invention also encompasses embodiments of connectors that do not require grooved modules (for example, connectors that otherwise fasten to the frame, for example, but not limited to, rock-in connectors that wrap around the top and bottom of the module frame).

As also seen, optional interlocks 326 (with rotatable couplings 327) can be used to secure two adjacent photovoltaic modules 321 together in the row (and additional modules next to these two modules). Specifically, interlocks 326 may be installed in grooves 323 of the module frames. However, the present invention also encompasses module-to-module interlocks that operate with no grooves. (For example module-to-module interlocks that instead simply wrap around the top and bottom of the module frames). Successive rows of photovoltaic modules can be grounded by conductive wires while the modules in each row can be grounded by interlocks 326 (i.e.: with couplings 327 rotated into locked positions within grooves 323), and/or by rock-in couplings 324. For example, these components may include one or more protrusions or teeth that engage the module teeth that cut into a frame of a photovoltaic module when couplings 327 are engaged with the module frame. In the case of rock-in couplings, the coupling may include a spring blade that cuts into a pair of respective module frames.

During assembly, support bases 100 are first placed on a flat or low-slope surface such as a flat roof. One advantage of the present design is that the bases used to support long legs 210A or short legs 210B may be identical. Thus, the bases used to support the lower side of the photovoltaic modules are interchangeable with the bases used to support the upper side of the photovoltaic modules. Next, the flared feet 213 of legs 210 are then inserted into slots 106 such that legs 210 extend upwardly from base 200. Preferably, the base 200 supports the legs 210 at a non-vertical angle, as shown.

Rock-in couplings 324 are mounted onto the top ends of legs 210. Rock-in couplings 324 optionally have a male key portion 325 that is received into grooves 323. When fully rotated (in direction R shown in FIG. 3E) into position, male portion 325 locks into groove 323. In addition, male portions 325 may bite into or otherwise deform groove 323 to ensure an electrically bonded connection. Examples of suitable rock-in couplings are manufactured by Zep Solar, LLC of San Rafael, Calif. It is to be understood, however, that the present invention is not so limited, and that other couplings and connectors may instead be used.

As can be seen, legs 210A and 210B extend upwardly from bases 100 at non-vertical angles. Therefore, when short leg 210B is rotated into position, it will be angled slightly underneath of the photovoltaic module (as seen best in FIG. 3D). As a result, the weight of photovoltaic module 321 will tend to keep the rock-in connector at the top of short leg 210B rotated into a locked position. This makes assembly easy since once the photovoltaic modules have been attached onto legs 210B, it will tend to remain in a locked position. A further advantage of the present system is that it accounts for thermal expansion and contraction of the modules as legs 210 may also lean or angle to accommodate thermal expansion and contraction of the modules.

However, as also seen best in FIG. 3D, long leg 210A will be angled out from underneath the photovoltaic modules such that its base 100 is not positioned directly underneath the photovoltaic module. As such, the weight of photovoltaic module 321 could otherwise tend to rotate the rock-in connector out of its locked position. Therefore, as seen in FIGS. 4A and 4B, a mechanism for securing the rock-in connector to the frame of the photovoltaic module is provided, as follows.

In FIG. 4A, an optional spring clip 329 is provided. Spring clip 329 projects outwardly and snaps around the lower portion of the frame of the photovoltaic module. Therefore, as the connector is rotated in direction R from the position of FIG. 4A to the position of FIG. 4B, spring clip 329 will snap around the lower edge 330 of the frame of the photovoltaic module, thereby preventing movement of the rock-in connector in a direction opposite to direction R.

FIG. 5 shows an alternate leg 210C comprising a U-shaped member (with rock-in connectors 325 at its opposite ends). As also seen in FIG. 1, base 100 depicted in FIG. 5 may comprise blocks 102A and 102B having trenches 103A and 103B therein. U-shaped connector 210C is received into trenches 103A and 103B and is rotatable therein (in direction R2). An advantage of movement in direction R2 is flexibility during positioning and assembly of the array.

Figure 6A:
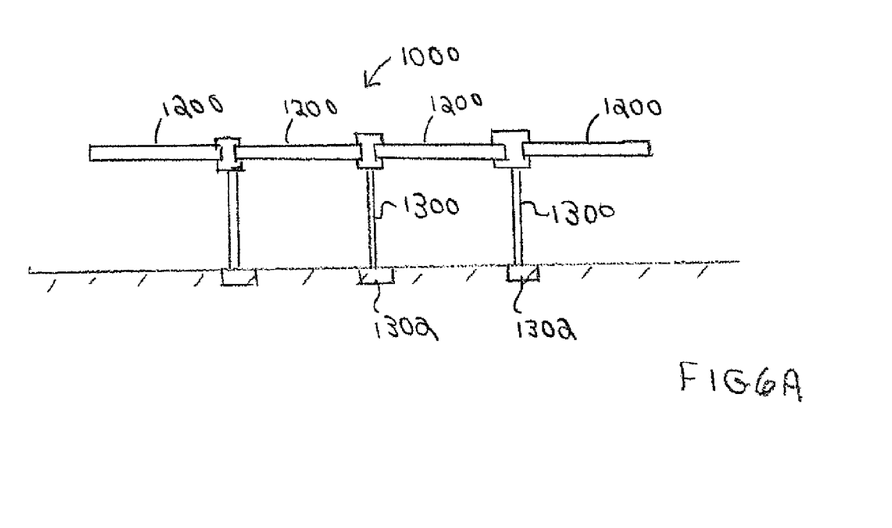
FIG. 6A is a side elevation view of a planar array.
Figure 6B:
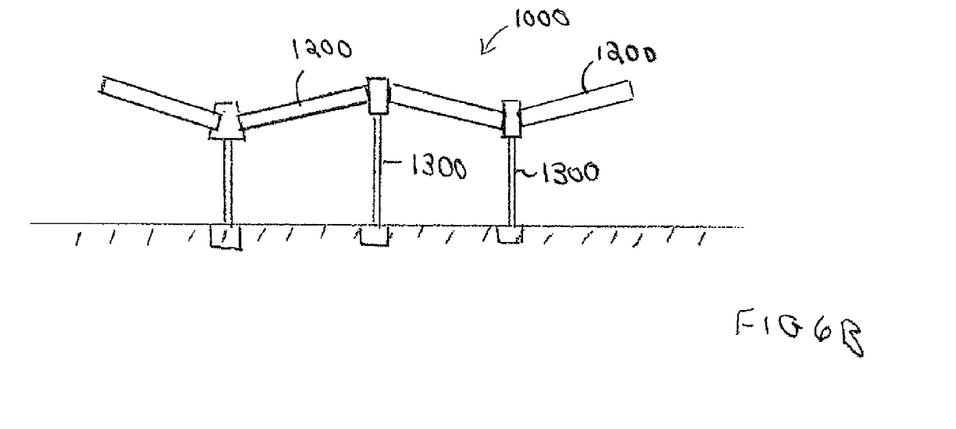
FIG. 6B is a side elevation view of the array of FIG. 6A after successive rows of supports have been raised and lowered.

A further advantage of the present invention can be seen by comparing the East/West array of FIG. 3D-2 to the array of FIGS. 6A and 6B. FIGS. 6A and 6B show an array 1000 of photovoltaic modules 1200 supported by leg supports 1300. Leg supports 1300 may be anchored into a concrete roof by epoxy anchors 1302. As seen in FIG. 6B, leg supports 1300 may be height adjustable (for example, they may each comprise height adjustable leveling feet, or they may even comprise leg supports of different heights) to achieve the low-angled orientation as seen in FIG. 6B. The array arrangement seen in FIG. 6B may be used to provide drainage to an otherwise flat planar array. However, one advantage of using the array of FIG. 3D-2 (as compared to the array of FIG. 6B) is that the array of FIG. 3D-2 provides a natural gap between the pairs of long legs 210A. This gap permits air to escape from below the array as air flows thereover. As such, epoxy anchors (such as 1302) may not be required.

What is claimed is:
1. A photovoltaic array mounting system, comprising:
(a) a plurality of non-horizontal photovoltaic modules, each photovoltaic module having an upper end and a lower end, each of the upper end and the lower end having an outward facing groove;
(b) a first base;
(c) a first leg extending upwardly from the first base;
(d) a first connector with a male portion at a top of the first leg engaged to the outward facing groove of the lower end of the photovoltaic module to connect the first leg to a single one of the plurality of photovoltaic modules;
(e) a second base;
(f) a second leg extending upwardly from the second base, the second leg having a length greater than the first leg; and
(g) a second connector with a male portion at a top of the second leg engaged to the outward facing groove of the upper end of the single one of the photovoltaic modules to connect the second leg to the photovoltaic module;
wherein the first leg is configured to rotate about a first axis substantially parallel to a surface that the mounting system is configured to be positioned on so as to cause the male portion of the first connector to lock to the outward facing groove of the lower end of the photovoltaic module and the second leg is configured to rotate about a second axis substantially parallel to the first axis to cause the male portion of the second connector to lock the outward facing groove of the upper end of the photovoltaic module, wherein a weight of the photovoltaic module keeps the first leg angled inwardly underneath the photovoltaic module so as to keep the first connector locked to the groove of the lower end of the photovoltaic module.

2. The system of claim 1, wherein at least one of the first and second legs includes a threadable portion such that the at least one of the first and second legs are height adjustable.

3. The system of claim 1, further comprising a mechanism for securing the second connector to a frame of a photovoltaic module, wherein the mechanism for securing the second connector is a clip dimensioned to snap around a lower portion of the frame of the photovoltaic module.

4. The system of claim 3, wherein the clip prevents the second connector from rotating with respect to the frame of the photovoltaic module.

5. The system of claim 1, wherein the dimensions of the first and second bases are the same such that the first and second bases are interchangeable with one another.

6. The system of claim 1, wherein a bottom end of the first leg is received in an aperture in the first base, and wherein a bottom end of the second leg is received in an aperture in the second base.

7. The system of claim 1, wherein the second leg comprises a U-shaped member with two second connectors at upwardly extending opposite ends, and wherein the U-shaped member rotates the two second connectors with respect to the first or second base.

8. The system of claim 7, wherein the first and second bases support the first and second legs at non-vertical angles.

9. The system of claim 8, wherein the second leg is angled outwardly away from the photovoltaic module.

10. The system of claim 1, wherein the first and second connectors are dimensioned to pivot into the outward facing grooves of the photovoltaic modules.

11. The system of claim 1, further comprising ballast blocks positioned on top of the first and second bases.

12. The system of claim 1, wherein the first and second bases have slots to receive a bottom end of the first leg therein.

13. The system of claim 1, further comprising:
(h) a third leg connected to the second leg by a base portion such that the third leg and the connected second leg, and the base portion therebetween form a substantially U-shaped configuration that is rotatable in a first direction and a second direction opposite the first direction, wherein rotation in each of the first and second directions rotates the third leg and the connected second leg simultaneously; and
(i) a third connector with a male portion at a top of the third leg engaged to the outward facing groove of the upper end of the photovoltaic module to connect the third leg to the photovoltaic module.

14. The system of claim 13, wherein the second base comprises a pair of blocks with trenches for receiving the U-shaped configuration formed by the third leg and the connected second leg, and the base portion therebetween wherein the U-shaped configuration is rotatable in the first and second direction when received in the trenches.

15. The system of claim 1, wherein each of the first leg and the second leg is configured to rotate in a first direction and a second direction opposite the first direction to engage the outward facing grooves.

16. The system of claim 1, wherein:
one of the first leg and the second leg comprises a flared foot; and
one of the first base and the second base comprises at least one slot shaped to receive the flared foot of one of the first leg and the second leg, the slot comprising a pair of overhangs that define outlets in which the one of the first leg and second leg that comprises the flared foot is disposed.

17. A photovoltaic array mounting system, comprising:
(a) a plurality of non-horizontal photovoltaic modules, each photovoltaic module having an upper end and a lower end;
(b) a first base with a first slot comprising a pair of overhangs that define a first outlet;
(c) a first leg with a first flared foot shaped to be received in the first slot, the first leg extending upwardly from the first base through the first outlet;
(d) a first connector at a top of the first leg connecting the first leg to the lower end of a single one of the plurality of photovoltaic modules;
(e) a second base with a second slot comprising a pair of overhangs that define a second outlet;
(f) a second leg with a second flared foot shaped to be received in the second slot, the second leg extending upwardly from the second base through the second outlet, the second leg having a length greater than the first leg; and
(g) a second connector at a top of the second leg connecting the second leg to the upper end of the single one of the plurality of photovoltaic modules;
wherein the first leg is configured to rotate about a first axis substantially parallel to a surface that the mounting system is configured to be positioned on so as to cause the first connector to be locked to the lower end of the photovoltaic module and the second leg is configured to rotate about a second axis substantially parallel to the first axis to cause the second connector to be locked to the upper end of the photovoltaic module, wherein a weight of the photovoltaic module keeps the first leg angled inwardly underneath the photovoltaic module so as to keep the first connector locked to a groove of the lower end of the photovoltaic module.

18. The system of claim 17, wherein at least one of the first and second flared feet include a threadable portion such that the at least one of the first and second legs are height adjustable.

19. A photovoltaic array mounting system, comprising:
(a) a plurality of non-horizontal photovoltaic modules, each photovoltaic module having an upper end and a lower end, each of the upper end and the lower end having an outward facing groove;
(b) a first base;
(c) a first leg extending upwardly from the first base;
(d) a first connector at a top of the first leg connecting the first leg to the lower end of a single one of the plurality of photovoltaic modules;
(e) a second base;
(f) a second leg extending upwardly from the second base; and
(g) a second connector at a top of the second leg connecting the second leg to the upper end of the single one of the plurality of photovoltaic modules;
wherein the first leg is configured to rotate about a first axis substantially parallel to a surface the mounting system is configured to be positioned on to cause a male portion of the first connector to lock to the outward facing groove of the lower end of the photovoltaic module and the second leg is configured to rotate about a second axis substantially parallel to the first axis to cause a male portion of the second connector to lock to the outward facing groove of the upper end of the photovoltaic module,
wherein the second leg comprises a U-shaped configuration formed by a base portion and a pair of upward extensions from the base portion, the base portion and upward extensions being formed from a single piece, and
wherein the second base comprises a pair of blocks with trenches for receiving the base portion of the second leg, wherein the second leg is rotatable in a first direction and a second direction opposite the first direction when received in the pair of trenches, wherein rotation in each of the first and second directions rotates the pair of upward extensions simultaneously.

* * * * *